Aug. 4, 1953
C. G. McLACHLAN
2,647,618
IDLER MECHANISM FOR CONVEYER BELTS
Filed July 17, 1948
2 Sheets-Sheet 1
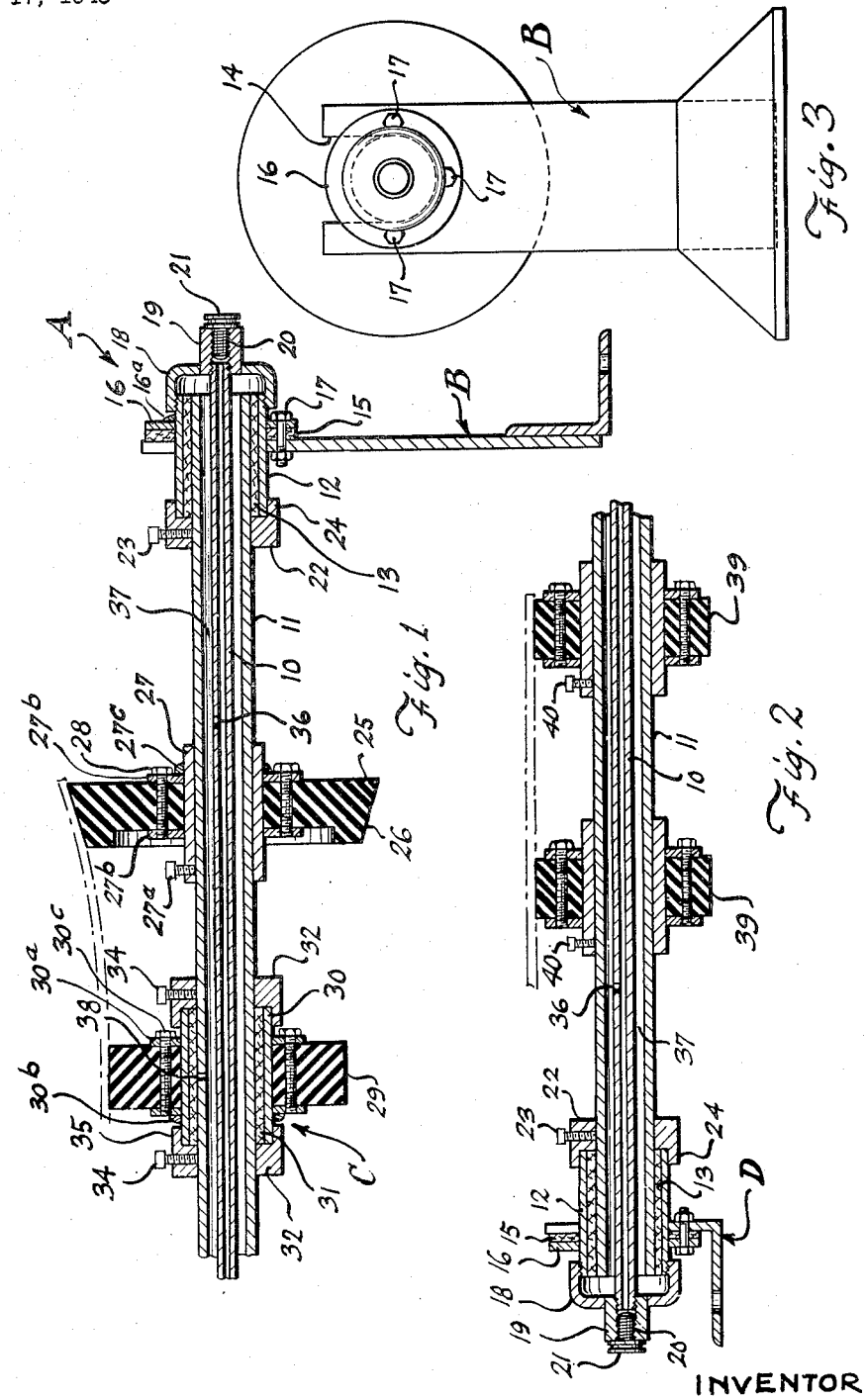
INVENTOR
C. G. McLACHLAN
By: Fetherstonhaugh & Co,
ATT'YS Aug. 4, 1953  C. G. McLACHLAN  2,647,618
IDLER MECHANISM FOR CONVEYER BELTS
Filed July 17, 1948  2 Sheets-Sheet 2
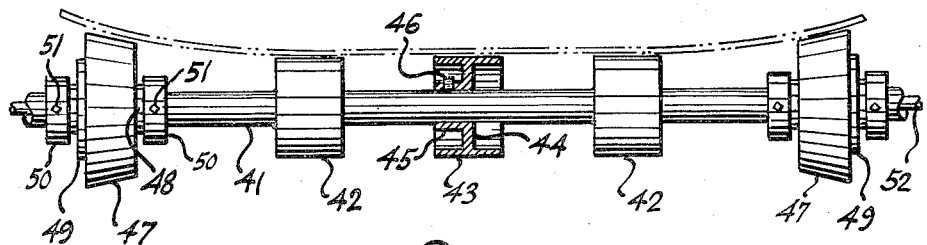
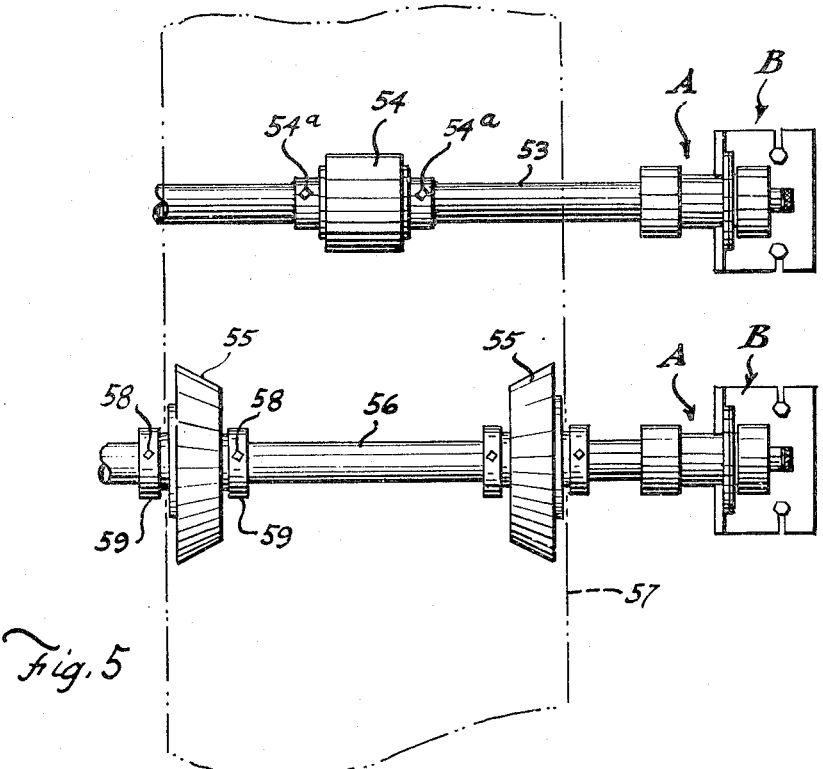
INVENTOR
C. G. McLACHLAN
By: Fetherstonhaugh & Co.
ATT'YS Patented Aug. 4, 1953

2,647,618

UNITED STATES PATENT OFFICE 2,647,618

IDLER MECHANISM FOR CONVEYER BELTS

Charles G. McLachlan, Noranda, Quebec, Canada

Application July 17, 1948, Serial No. 39,359

6 Claims. (Cl. 198—192)

This invention relates to an idler mechanism for conveyor belts, wherein a plurality of idlers are mounted on a shaft, and at least one of the idlers is fixed to the shaft so as to rotate said shaft.

Idler mechanisms for conveyor belts, particularly of the lighter load class, are unduly complicated as regards their structure. Installation costs are therefore usually excessively high where conveyor belts could be used to good advantage in the handling of materials such as feed grains, comminuted ores, and the like. In idler mechanisms currently in use, each idler mounting must usually be lubricated independently. Moreover, in cases where fine dusty material is being handled, the lack of clearance between adjacent idler rollers may cause them to seize. This results in unnecessary wear not only on the rolls but also on the conveyor belt.

By virtue of the design of idler mechanism previously employed for carrying conveyor belts, it has been necessary to choose specific design arrangements for specific purposes. This is a disadvantage where changes are required in conveyor belt arrangements in any one installation.

It is a particular object of the present invention, therefore, to provide a troughing idler mechanism for conveyor belts in which all the idlers are mounted on a hollow rotatable shaft. This shaft is carried by bearings at either end and these bearings are connected by a hollow stationary tube which extends throughout the hollow shaft in spaced apart relation therefrom. This hollow tube serves the dual purpose of introducing lubricant into the hollow shaft, whereby said shaft functions as a lubricant reservoir throughout its entire length, and of preventing the bearings from spreading laterally when lubricant under pressure is introduced therein.

It is a further object to provide an idler mechanism for conveyor belts in which all the idlers are mounted on a hollow rotatable shaft, and in which the manner of mounting the idlers is such that they may be mounted at any point along the shaft, and may, by a simple adjustment, be caused to take up new positions relative to one another, when changes are required in conveyor belt arrangements.

It is a further object of the invention to provide an idler mechanism for conveyors which, by virtue of its simple construction, may be quickly and easily assembled and dismantled, and whereby the bearings may be readily replaced.

A further object of the invention is to provide a simplified idler arrangement for conveyor belts which includes a pair of troughing idlers fixed to a shaft of the above character and mounted on bearings carried by suitable means, in conjunction with a second shaft of the said character carrying at least one simple idler, wherein the said simple idler is fixed to its shaft which is also mounted on suitable bearings supported by suitable brackets. By this means, the degree of troughing can be controlled by inserting a different troughing idler arrangement into a conveyor belt installation and facility of arrangement is thereby afforded, giving a maximum of flexibility of arrangement.

A still further object of the invention is to provide an idler mechanism as described which is of comparatively simple construction and which is free from interference caused by dust particles.

With these and other objects in view, the invention comprises a rotatable hollow shaft having bearing means at both ends supported by suitable stands or brackets. The exterior sleeve casing or housing of the end bearings mounts a stationary lubricating tube which extends longitudinally within the hollow shaft of spaced apart relation to the interior surfaces thereof. At predetermined intervals, longitudinally of the tube, ports are provided to allow the escape of lubricating fluid from the interior of the tube into the chamber formed between the interior walls of the hollow shaft and the exterior surfaces of the longitudinally extending tube, whereby said chamber is filled with lubricant when the mechanism is in use. At least one idler is mounted upon said rotatable hollow shaft. Wherever more than one idler is employed, and the idlers are all of the same size, then these idlers are fixed to the shaft, but wherever two idlers of differing size are employed then bearing means are provided, whereby one of said idlers is rotatably mounted upon the shaft. Wherever an idler is rotatably mounted upon the shaft a port is provided in the shaft whereby lubricating fluid is conducted to the bearing means.

Other objects of the invention will be appreciated from a study of the following specification wherein practical embodiments of the invention are described in conjunction with the accompanying drawings.

In the drawings:

Figure 1 is a partial sectional view of an idler mechanism according to my invention showing one half of a troughing idler arrangement.

Figure 2 is a sectional view of a troughing idler arrangement which is particularly adapted for carrying a conveyor belt under no-load conditions such as guiding the under-loop of a conveyor belt.

Figure 3 is an end view of the structure shown in Figure 1.

Figure 4 is an alternative arrangement in accordance with the invention.

Figure 5 is a plan view of an arrangement of idler devices according to the invention being only a partial view revealing a simple idler mounted on its shaft operatively arranged in conjunction with a separate shaft carrying the troughing idlers.

Referring now to the drawings, in Figure 1, a longitudinally extending lubricating tube 10, is shown in spaced apart relation to the interior walls of the hollow shaft 11. The hollow shaft 11 thus acts as a lubricating reservoir and is rotatably mounted by means of bearings A which in turn are mounted in the support brackets B.

The bearing A is comprised of the outer sleeve or housing 12 in which is mounted a suitable bearing. In Figure 1 the housing is shown as carrying a bearing liner 13 of suitable material such as babbitt or bronze, which in turn supports the end of the hollow shaft 11. The housing 12 is stationary and is adjustably clamped into the U-shaped support 14 of the bracket B by means of flexible separating means such as springs or a washer of rubber, leather or like flexible material, and the ring 16 welded to housing 12 as at 16a and suitable bolts 17. A cap 18 is thread mounted on to the end of the housing 12 and carries the fitting 19 which has inner thread means 20 which are designed to mate with the threads on the end of the tube 10 to mount the tube 10 relative to the interior surfaces of the shaft 11. If increased flexibility of tube 10 is desired, a slot may be cut therein. This step has not been taken in the case of apparatus described and illustrated as exemplifying the invention, but it is now pointed out that where such a slot is provided it should preferably be located near the end of the tube 10 remote from the end whereby lubricant is introduced. A button head fitting 21 is also designed to fit into the threads 20 to receive the feeding nipple of a grease gun or the like for injection of lubricant into tube 10. Any end thrust conditions are taken care of by providing a collar 22 which is connected to the shaft 11 by means of a set screw 23 or by other suitable means, and which has an annular flange 24 partially enclosing housing 12 of the bearing.

A pair of troughing idlers 25, are adjustably mounted in spaced apart relation on the shaft 11 by the mounting 27, mounting 27 being adjustably secured on shaft 11 preferably by means of set screws 27a, and idlers 25 being secured upon mounting 27 by means of bolts 28, which pass through collars 27b, one of which is secured to mounting 27 by welding, as at 27c. It is to be noted that, although only one idler 25 is shown in the drawings, another idler of the same character is disposed on the other side of the simple idler 29. The simple idler 29, is of a lesser diameter than the idler 25 and is designed to support the centre region of a conveyor belt under load. Obviously, the circumferential speed of the troughing idlers will be different from the circumferential speed of the idler 29. Therefore, a simple bearing mechanism means C is provided for rotatably mounting the simple idler on the shaft 11. This bearing comprises a housing sleeve 30 mounting the troughing idler 29 by means of collars 30a, one of which is welded to sleeve 30 as at 30b, and bolts 30c passing through said collars and said idler. Sleeve 30 carries on its inner surface a Babbitt or bronze liner 31 which engages the outer surfaces of the shaft 11. In order to adjustably locate the idler 29 on the shaft, collars 32 are provided which are adjustably located on shaft 11 by means of set screws 34. The collars 32 have annular flanges 35 partially enclosing housing sleeve 30.

One or more ports 36 are provided in the reservoir or tube 10 to allow the lubricant to find its way into the annular chamber 37 between the tube 10 and the inner surfaces of the shaft 11, and fill said chamber when the idler mechanism is in use. In the region of the bearings C lubricating ports 38 are provided to communicate lubricant to the bearing liner 31.

In Figure 2 an arrangement of simple and conventional idlers 39 is shown which are fastened by conventional means to the shaft 11 by set screws as at 40 or by other suitable expedients. This is the conventional arrangement used for carrying a conveyor belt under no-load conditions or under conditions for guiding an under-loop of a belt. The bracket D in this case is substantially similar to the bracket B but is merely shorter. Like numerals indicate like components.

The arrangement of Figure 4 is included to show a modification of the structure described above. In this case, the hollow shaft 41, in all characteristics substantially similar to the shaft 11 of Figure 1, carries the idlers 42 which in this instance may be cast of relatively light metal if desired as indicated by the sectional contours in the middle idler wherein the same is formed with a rim shell 43 with the centre web 44 extending from the collar 45, the latter being fastened to the shaft 41 by means of set screws 46 or other suitable expedients. The troughing idlers 47 are similar in construction to the troughing idler 25 shown in Figure 1 except that in this instance they are mounted on the sleeve housings 48 by the flanges 49, the latter partially enclosing bearing mechanisms of the same character indicated by the letter C of Figure 1, said bearings being lubricated in the same manner, that is to say, by ports. In this instance collars 50 are fastened to the shaft 41 by means of set screws 51 whereby the troughing idlers are adjustable axially of the shaft 41. In accordance with the previous description, the shaft 41 carries the inner lubricant reservoir tube 52, the ends of the shaft being mounted by bearings suitably supported by brackets such as bearings A and brackets B of Figure 1 (not shown). In the case of the arrangement shown in Figure 4, due to the differing speeds of rotation of idlers 42 and idlers 47, troughing idlers 47 will have a speed of rotation differing from that of the shaft 41.

The illustration of Figure 5 reveals a particularly simplified arrangement whereby maximum flexibility is provided in modifying an installation using devices according to the present invention. Thus, the hollow shaft 53, carrying a tube reservoir (not shown) as before carries a single idler 54 of a pair of such idlers as the case may be, fixed thereto by any suitable means. The letter A here indicates a bearing structure of the same character as the bearings A of Figure 1, the letter B illustrating a similar bracket arrangement. In conjunction with this idler device, a separate troughing idler device may be used, such as the troughing idlers 55 which are fixed to the hollow shaft 56, the latter being similar to the shaft 11 and mounted on bearings A supported by brackets B as before. In this arrangement the troughing idlers 55 and idler 54 will carry the conveyor belt 57 in such manner that it is troughed.

As shown, I prefer to have the idler 54 adjustable axially of the shaft 53 by providing fastening means therefor in the form of the set screws 54a; similarly the idlers 55 are adjustably mounted by the set screws 58 as the collars 59 thereof.

In the accompanying drawings the troughing idlers have been shown as having inwardly sloping surfaces. Such a form of idler has been used as an example only, and should not be construed as limiting the scope of the invention in any respect, since flat faced troughing idlers and also troughing idlers with rounded faces have been found suitable and sometimes preferable under certain conditions.

It will thus be apparent that I have provided a simple and efficient idler construction which is adapted to be modified in any particular installation to give maximum flexibility of arrangement at low cost with attendant advantages concerning facility of maintenance.

What I claim as my invention is:

1. An idler mechanism for conveyor belts adapted to be mounted on brackets, comprising bearing means mountable on said brackets, a hollow shaft rotatably mounted within said bearing means, a straight hollow stationary lubricating tube mounted by said bearing means and of a length greater than said hollow shaft but supported thereby, and disposed within said shaft in spaced apart relation therefrom, whereby an annular chamber is formed by the interior walls of said shaft and the exterior walls of said tube, a plurality of idlers mounted upon said shaft, means in connection with said bearing means for receiving lubricant under pressure into said tube, at least one port in said tube for communicating lubricant from said tube into said annular chamber, and passages in said hollow shaft for communicating lubricant from said chamber to said bearings.

2. An idler mechanism for conveyor belts adapted to be mounted on brackets, comprising bearing means mountable on said brackets, a straight hollow shaft rotatably mounted within said bearing means and of a length greater than said hollow shaft but supported thereby, said bearing means having a stationary outer sleeve, means extending from said sleeve and enclosing the end of said bearing and said shaft, a straight longitudinally extending tube disposed within said shaft and held in stationary relationship therein by fixture in said means extending from said sleeve at either end of said shaft, means for conducting lubricant to said tube, at least one lubricating port in said tube, means for communicating lubricant to said bearings, and a plurality of idlers mounted upon said shaft.

3. An idler mechanism for conveyor belts adapted to be mounted on brackets, comprising bearing means mountable on said brackets, a straight hollow shaft rotatably mounted within said bearing means, said bearing means having a stationary outer sleeve, means extending from said sleeve and enclosing the end of said bearing and said shaft, a longitudinally straight extending tube disposed within said shaft and held in stationary relationship therein by fixture in said means extending from said sleeve at either end of said shaft, means for conducting lubricant to said tube, at least one lubricating port in said tube, means for communicating lubricant to said bearings, a plurality of idlers axially adjustably mounted upon said shaft.

4. In idler mechanism for conveyor belts, the combination of; bearing brackets, a straight hollow shaft journalled in said brackets and extending therebetween, a straight hollow stationary lubricating tube within said hollow shaft being supported by but of a length greater than the latter, means for mounting said tube extending from said brackets and serving to seal the ends of said hollow shaft, a plurality of idlers mounted on said shaft, an inlet in said tube mounting means by which lubricant may be fed under pressure into said tube, said tube being of lesser diameter than said hollow shaft to provide an annular chamber of substantial radial depth extending between said shaft and tube, and at least one port in said tube for communicating lubricant from the tube into said annular chamber.

5. An idler mechanism for conveyor belts comprising; brackets, bearing means in said brackets, a hollow shaft rotatably mounted in said bearing means, a straight hollow stationary lubricating tube of a length greater than that of said hollow shaft but supported by the latter and disposed within said shaft in spaced apart relation therefrom, whereby an annular chamber of substantial radial depth is formed by the interior walls of said shaft and the exterior walls of said tube, a plurality of idlers adjustably mounted upon said shaft, means in connection with said bearing means for receiving lubricant under pressure into said tube, at least one port in said tube for communicating lubricant from said tube into said annular chamber, and passages in said hollow shaft for communicating lubricant from said chamber to said bearings.

6. An idler mechanism for conveyor belts comprising; a pair of brackets, bearing means in said brackets, a straight hollow shaft rotatably mounted within said bearing means, said bearing means having a stationary outer sleeve, means extending from said sleeve and enclosing the end of said bearing and said shaft, a straight longitudinally extending tube disposed within said shaft but of greater length than the latter and held in stationary relationship therein by fixture in said means extending from said sleeve at either end of said shaft to effectively provide support of said tube by said shaft, means for conducting lubricant to said tube, at least one lubricating port in said tube, passages in said hollow shaft for communicating lubricant to said bearings, at least one idler and means for adjustably mounting said idler on said shaft.

CHARLES G. McLACHLAN.

References Cited in the file of this patent

UNITED STATES PATENTS

| Number | Name | Date |
|---|---|---|
| 714,812 | Mann et al. | Dec. 2, 1902 |
| 687,331 | Muth | May 19, 1903 |
| 1,446,312 | Mellin | Feb. 20, 1923 |
| 1,502,976 | Baldwin et al. | July 29, 1924 |
| 1,742,453 | Van Derhoef | Jan. 7, 1930 |
| 2,052,900 | Searles et al. | Sept. 1, 1936 |

FOREIGN PATENTS

| Number | Country | Date |
|---|---|---|
| 484,423 | Germany | Oct. 15, 1929 |